(12) United States Patent
Durand

(10) Patent No.: US 7,578,060 B2
(45) Date of Patent: Aug. 25, 2009

(54) METHOD OF MANUFACTURING A VEHICLE FRAME ASSEMBLY

(75) Inventor: Robert D. Durand, Lancaster, PA (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 602 days.

(21) Appl. No.: 11/136,093

(22) Filed: May 24, 2005

(65) Prior Publication Data

US 2005/0257373 A1 Nov. 24, 2005

Related U.S. Application Data

(60) Provisional application No. 60/573,820, filed on May 24, 2004.

(51) Int. Cl.
*B21D 53/88* (2006.01)
(52) U.S. Cl. ................................ 29/897.2
(58) Field of Classification Search ............ 29/897.2, 29/446, 448, 452, 428, 507, 506; 296/35.1
See application file for complete search history.

(56) References Cited

U.S. PATENT DOCUMENTS

| | | | |
|---|---|---|---|
| 1,630,036 A | 5/1927 | Smith | |
| 1,700,477 A | 1/1929 | Goode | |
| 2,939,719 A * | 6/1960 | Parker | ................ 280/793 |
| 4,746,146 A | 5/1988 | Hirabayashi et al. | |
| 5,472,259 A | 12/1995 | Akiyama et al. | |

\* cited by examiner

*Primary Examiner*—John C Hong
(74) *Attorney, Agent, or Firm*—Marshall & Melhorn LLC

(57) ABSTRACT

A vehicular frame assembly is manufactured by initially providing a vehicular frame assembly that is formed from a plurality of structural members, each having an inherent torsional rigidity. Then, a desired inherent torsional rigidity can be determined for at least one of the plurality of structural members. Lastly, the at least one of the plurality of structural members can be deformed to achieve the desired inherent torsional rigidity. Alternatively, the vehicular frame assembly can be manufactured by initially providing a plurality of structural members, each having an inherent torsional rigidity. A desired inherent torsional rigidity can be determined for at least one of the plurality of structural members, and the at least one of the plurality of structural members is deformed to achieve the desired inherent torsional rigidity. Lastly, the plurality of structural members can be assembled to form the vehicular frame assembly.

9 Claims, 4 Drawing Sheets

METHOD OF MANUFACTURING A VEHICLE FRAME ASSEMBLY

CROSS-REFERENCE TO RELATED APPLICATIONS

This application claims the benefit of U.S. Provisional Application No. 60/573,820, filed May 24, 2004, the disclosure of which is incorporated herein by reference.

BACKGROUND OF THE INVENTION

This invention relates in general to methods of manufacturing vehicular frame assemblies. In particular, this invention relates to an improved method of manufacturing such a vehicular frame assembly that facilitates the adjustment of the inherent torsional rigidity thereof and, therefore, permits the overall handling characteristic of the vehicle to be customized in a relatively simple and inexpensive manner.

Many land vehicles in common use, such as automobiles, vans, and trucks, include a body and frame assembly that is supported upon a plurality of ground-engaging wheels by a resilient suspension system. The structures of known vehicular body and frame assemblies can be divided into two general categories, namely, separate and unitized. In a typical separate body and frame assembly, the structural members of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural members of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the various structural members of a vehicular body and frame assembly have been formed from open channel structural members, i.e., structural members that have a non-continuous cross sectional shape (such as U-shaped or C-shaped channel members, for example). For example, it is known to use one or more open channel structural members to form the side rails, the cross members, and other structural members of a ladder frame type of separate body and frame assembly. However, the use of open channel structural members to form the various components of vehicular body and frame assemblies has been found to be undesirable for several reasons. To address this, it has been proposed to form one or more of the structural members of the vehicular body and frame assemblies from closed channel structural members, i.e., structural members that have a continuous cross sectional shape (such as tubular or box-shaped channel members, for example). This cross sectional shape has been found to be advantageous for several reasons.

The term "handling characteristic" is a somewhat colloquial expression that is commonly used to describe the response of a vehicle to the variety of conditions that are encountered during operation. A significant component of the overall handling characteristic of any given vehicle is contributed by the design of the vehicular body and frame assembly. It is known that the vehicular body and frame assembly is subjected to a variety of forces during use, and the design of the vehicular body and frame assembly will determine how it will respond to the imposition of these forces.

One important aspect in the design of the vehicular body and frame assembly is the inherent torsional rigidity of the individual structural members that make up the vehicular body and frame assembly. The inherent torsional rigidity of an individual structural member (closed channel or otherwise) is a function of a variety of factors related to the construction thereof, including size, shape, type of material, and the like. It is known that the inherent torsional rigidity of each of the individual structural members can be calculated mathematically or determined empirically.

As is well known, the design and manufacture of vehicular body and frame assemblies is a relatively time consuming and expensive process. Thus, for the sake of economy, it is known to use a single design of a vehicular body and frame assembly in a variety of different vehicles. Although this method has been cost effective, it has been found to be somewhat undesirable because all of the different vehicles that share a common vehicular body and frame assembly will, in large measure, share essentially the same handling characteristic, thus making it relatively difficult to differentiate between such vehicles. Accordingly, it would be desirable to provide an improved method of manufacturing a vehicular body and frame assembly that facilitates the adjustment of the inherent torsional rigidity thereof and, therefore, permits the overall handling characteristic of the vehicle to be customized in a relatively simple and inexpensive manner.

SUMMARY OF THE INVENTION

This invention relates to an improved method of manufacturing a vehicular frame assembly that facilitates the adjustment of the inherent torsional rigidity thereof and, therefore, permits the overall handling characteristic of the vehicle to be customized in a relatively simple and inexpensive manner. The vehicular frame assembly can be manufactured by initially providing a vehicular frame assembly that is formed from a plurality of structural members, each having an inherent torsional rigidity. Then, a desired inherent torsional rigidity can be determined for at least one of the plurality of structural members. Lastly, the at least one of the plurality of structural members can be deformed to achieve the desired inherent torsional rigidity. Alternatively, the vehicular frame assembly can be manufactured by initially providing a plurality of structural members, each having an inherent torsional rigidity. A desired inherent torsional rigidity can be determined for at least one of the plurality of structural members, and the at least one of the plurality of structural members is deformed to achieve the desired inherent torsional rigidity. Lastly, the plurality of structural members can be assembled to form the vehicular frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
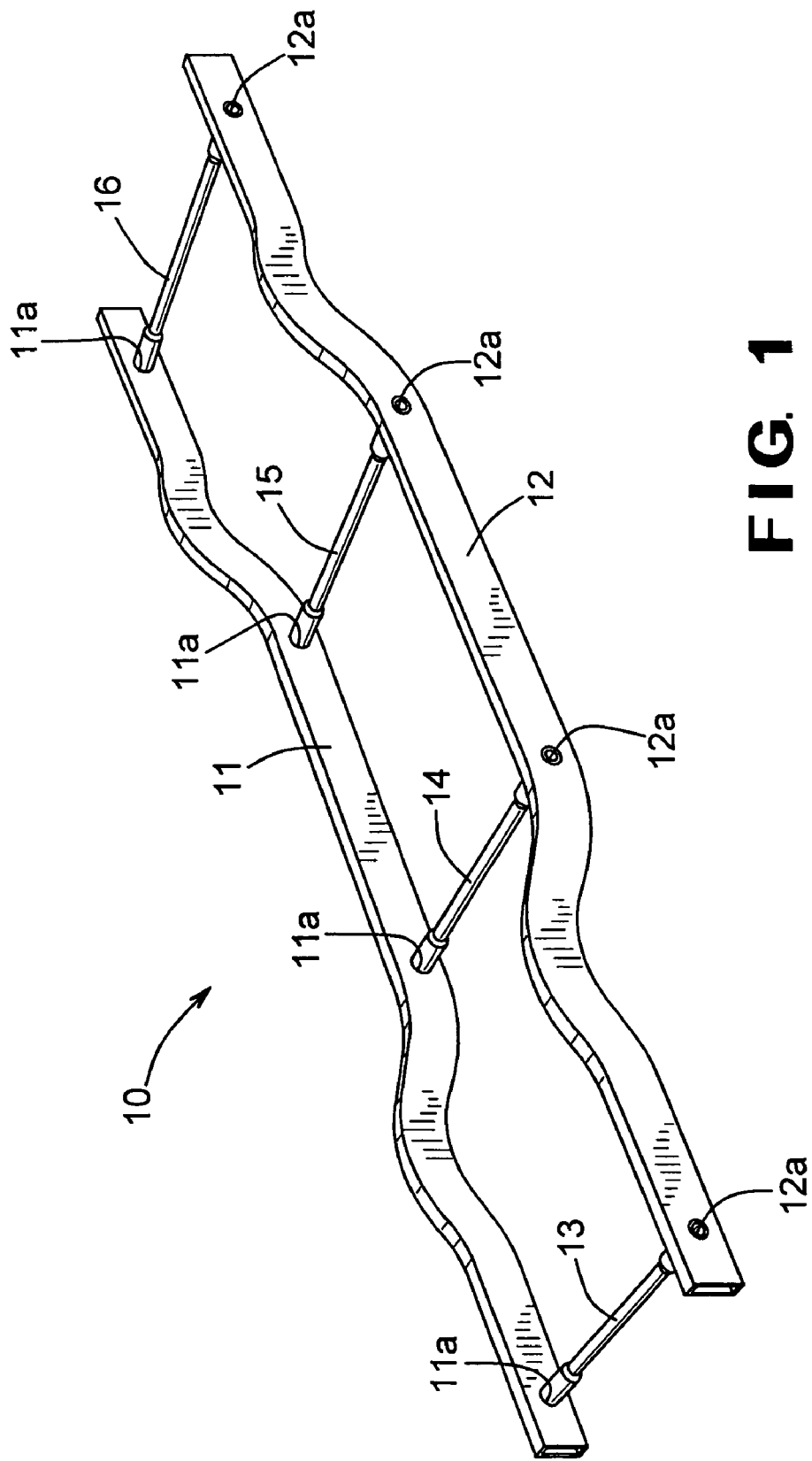
FIG. 1 is a perspective view of a vehicular frame assembly that is shown at an initial stage of manufacture in accordance with the method of this invention.

Referring now to the drawings, there is illustrated in FIG. 1 a vehicular frame assembly, indicated generally at 10, that is shown at an initial stage of manufacture in accordance with the method of this invention. The illustrated vehicular frame assembly 10 is, in large measure, conventional in the art and is intended merely to illustrate one environment in which this invention may be used. Thus, the scope of this invention is not intended to be limited for use with the specific structure for the vehicular frame assembly 10 illustrated in FIG. 1 or with vehicular frame assemblies in general. On the contrary, as will become apparent below, this invention may be used in any desired environment for the purposes described below.

The illustrated vehicular frame assembly 10 is a ladder frame assembly that includes a pair of longitudinally extending side rails 11 and 12 having a plurality of transverse cross members 13, 14, 15, and 16 extending therebetween. The illustrated side rails 11 and 12 extend longitudinally throughout the entire length of the illustrated ladder frame assembly 10 and are generally parallel to one another, although such is not required. Each of the side rails 11 and 12 is formed from a single closed channel structural member having a generally hollow, rectangular cross sectional shape. However, one or both of the side rails 11 and 12 may be formed from a plurality of closed channel structural members that are secured together by any conventional means (such as by welding, riveting, bolting, and the like) and may have any other desired cross sectional shape or shapes. Also, portions of one or both of the side rails 11 and 12 may be formed from open channel structural members or a combination of closed channel and open channel structural members if desired.

The illustrated cross members 13 through 16 are spaced apart from one another along the length of the illustrated ladder frame assembly 10 and extend generally perpendicularly relative to the side rails 11 and 12, although such is not required. Each of the cross members 13 through 16 is formed from a single closed channel structural member having a generally hollow, circular cross sectional shape. However, some or all of the cross members 13 through 16 may be formed from a plurality of closed channel structural members that are secured together by any conventional means (such as by welding, riveting, bolting, and the like) and may have any other desired cross sectional shape or shapes. Lastly, portions of some or all of the cross members 13 through 16 may be formed from open channel structural members or a combination of closed channel and open channel structural members if desired.

Figure 2:
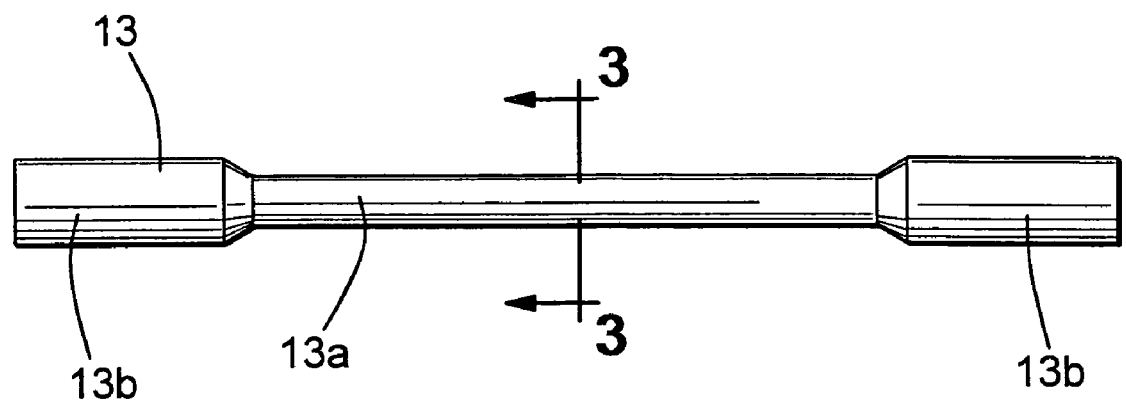
FIG. 2 is an enlarged front elevational view of one of the cross members of the vehicular frame assembly illustrated in FIG. 1.
Figure 3:
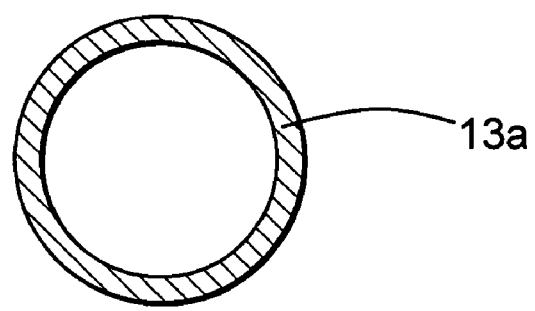
FIG. 3 is a sectional elevational view of a portion of the cross member taken along line 3-3 of FIG. 2.

The structure of one of the cross members 13 of the illustrated ladder frame assembly 10 at the initial stage of manufacture is illustrated in detail in FIGS. 2 and 3. As shown therein, the illustrated cross member 13 is generally hollow and cylindrical in shape, including a central portion 13a having a pair of end portions 13b extending therefrom. In the illustrated cross member 13, the end portions 13b are somewhat larger in diameter than the central portion 13a. However, it is known to form the end portion 13b of the cross member 13 having other sizes relative to the central portion 13a. As best shown in FIG. 3, the cross sectional shape of the illustrated cross member 13 is circular throughout the entire length thereof. However, as mentioned above, the cross member 13 may be formed having any desired cross sectional shape or shapes.

Referring back to FIG. 1, it can be seen that the end portions 13b of the cross member 13 are received in respective openings 11a and 12a that are formed in or through the first and second side rails 11 and 12. Preferably, the end portions 13b of the cross member 13 are secured to the side rails 11 and 12 using magnetic pulse welding techniques. However, the end portions 13b of the cross member 13 can be secured to the side rails 11 and 12 in any desired manner, such as by welding, riveting, bolting, and the like. The other cross members 14 through 16 can be secured to the side rails 11 and 12 in a similar manner. When secured to the side rails 11 and 12, the cross members 13 through 16 provide lateral and torsional rigidity to the illustrated ladder frame assembly 10. The side rails 11 and 12 and the cross members 13 through 16 may be formed from any desired material or combination of materials including, for example, steel, aluminum, plastics, composites (such as fiber matrix composites), and the like.

The initial stage of manufacture of the vehicular frame assembly illustrated in FIGS. 1, 2, and 3 is representative of the traditional method of manufacturing the vehicular frame assembly 10. As discussed above, a significant component of the overall handling characteristic of any given vehicle is provided by the design of the vehicular frame assembly 10. It is known that the vehicular frame assembly 10 is subjected to a variety of forces during use, and the design of the vehicular frame assembly 10 will determine how it will respond to the imposition of these forces. One important aspect in the design of the vehicular frame assembly 10 is the inherent torsional rigidity of each of the individual structural members (i.e., the side rails 11 and 12 and the cross members 13 through 16) that make up the vehicular frame assembly 10.

The inherent torsional rigidity of any individual structural member (closed channel or otherwise) is a function of a variety of factors related to the construction thereof, including size, shape, type of material, and the like. For example, regardless of the specific shape thereof (such as the hollow, circular cross sectional shape illustrated in FIGS. 1, 2, and 3), the cross member 13 has an inherent torsional rigidity that is a function of a variety of factors related to the overall construction thereof, including size, shape, type of material, and the like. Although each of these factors is important in determining the inherent torsional rigidity of the cross member 13, this invention is primarily concerned with that portion of the inherent torsional rigidity that is derived from the cross sectional shape of the cross member 13.

In the traditional method of manufacturing the vehicular frame assembly 10, all of the structural members of the vehicular frame assembly 10 had a single, fixed shape. In other words, for a given design criteria, the result was a single design for the vehicular frame assembly 10. Although this method was cost effective, it was found to be somewhat undesirable because all of the different vehicles that shared a common design for the vehicular frame assembly shared, in large measure, essentially the same handling characteristic. Thus, it was relatively difficult for the manufacturer to differentiate between such vehicles. This invention provides a further step in the manufacture of the vehicular frame assembly 10 that facilitates the adjustment of the inherent torsional rigidity of the individual structural members and, therefore, permits the overall handling characteristic of the vehicle to be customized in a relatively simple and inexpensive manner.

Figure 4:
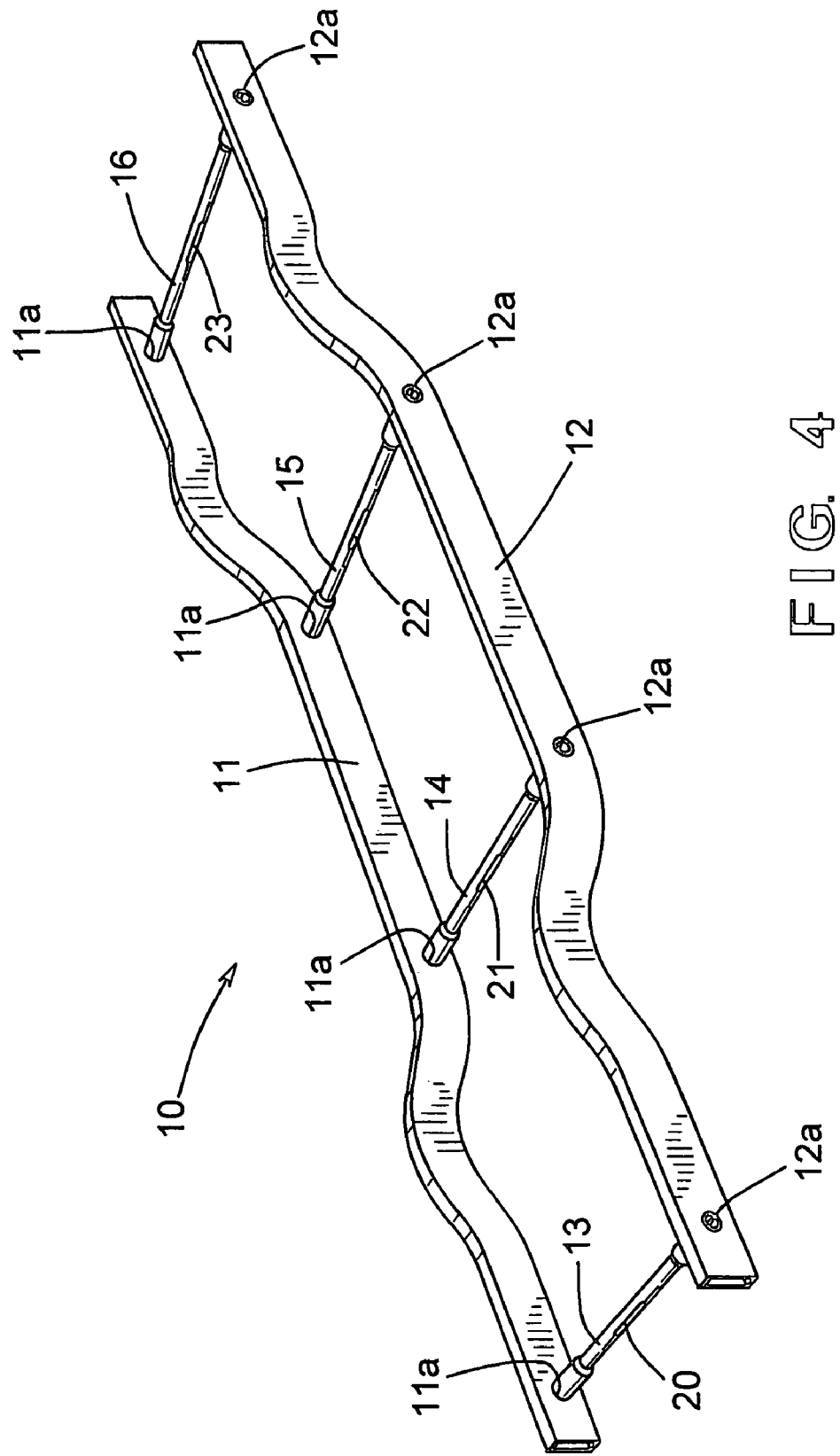
FIG. 4 is a perspective view of a vehicular frame assembly that is shown at a final stage of manufacture in accordance with the method of this invention.
Figure 5:
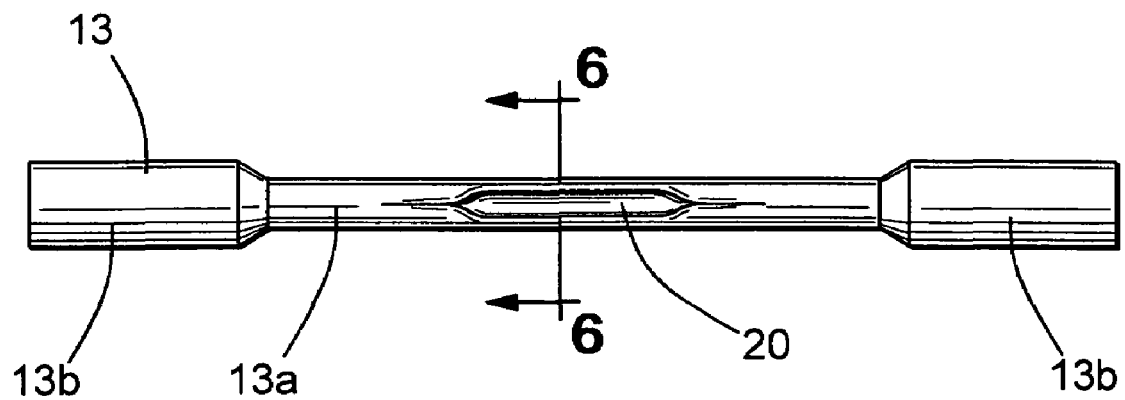
FIG. 5 is an enlarged front elevational view of one of the cross members of the vehicular frame assembly illustrated in FIG. 4.
Figure 6:
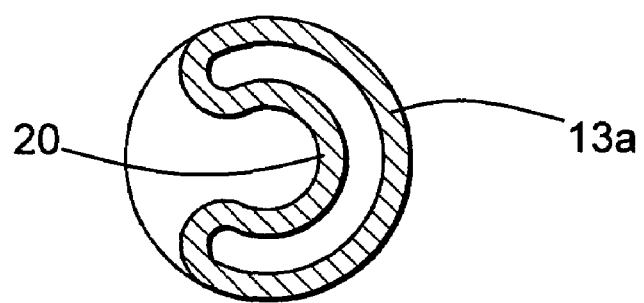
FIG. 6 is a sectional elevational view of a portion of the cross member taken along line 6-6 of FIG. 5.

FIGS. 4, 5, and 6 illustrate the vehicular frame assembly 10 at a final stage of manufacture in accordance with the method of this invention. As shown therein, a deformed region 20 is formed in each of the cross members 13 through 16. However, it will be appreciated that such deformed regions 20 may be provided in only some or one of the cross members 13 through 16. The purpose of the deformed regions 20 is to alter the inherent torsional rigidity of the associated cross members 13 through 16 from their initial original values (i.e., the values prior to forming the deformed regions 20 therein) to final desired values that are determined in accordance with the intended handling characteristic for the vehicular frame assembly 10. Thus, the adjustment of the inherent torsional rigidities of the cross members 13 through 16 (and, therefore, the overall handling characteristic of the vehicle) may be customized in a relatively simple and inexpensive manner.

As best shown in FIGS. 5 and 6, the illustrated deformed region 20 is formed in the central portion 13a of the cross member 13. However, the deformed region 20 may be formed in any desired portion of the cross member 13. Additionally, a plurality of such deformed regions 20 may be formed at different locations in the cross member 13. The deformed region 20 may be formed in the cross member 13 using any desired method or combination of methods. In particular, magnetic pulse forming techniques may be used to form the deformed region 20. Magnetic pulse forming is a well known process that can be used to deform one or more metallic workpieces to a desired shape. Typically, a magnetic pulse forming process is performed by initially disposing portions of first and second workpieces in an overlapping relationship. Then, an electromagnetic field is generated either within or about the overlapping portions of the first and second workpieces. When this occurs, a large pressure is exerted on one of the first and second workpieces, causing it to move toward the other of the first and second workpieces. If the electromagnetic field is generated about the exterior of the two workpieces, then the outer workpiece is deformed inwardly into engagement with the inner workpiece. If, on the other hand, the electromagnetic field is generated within the interior of the two workpieces, then the inner workpiece is deformed outwardly into engagement with the outer workpiece. In a magnetic pulse forming process, a relatively low intensity electromagnetic field is generated. As a result, the first workpiece impacts the second workpiece at a relatively small velocity, thereby causing the first workpiece merely to be deformed into conformance with the second workpiece.

In the illustrated embodiment, the deformed region 20 has a generally C-shaped cross sectional configuration, as best shown in FIG. 6. However, the deformed region 20 may be formed having any desired cross sectional shape. Also, the deformed region 20 may be formed as either an expanded or reduced diameter portion having the same general cross sectional shape as shown in FIGS. 1 through 3. The adjacent non-deformed regions of the central portion 13a of the cross member 13 are generally circular in cross sectional shape, although again such is not required. Furthermore, although the illustrated deformed region 20 is formed in the cross member 13, it will be appreciated that the deformed region or regions 20 may be formed in any other of the structural members of the vehicular frame assembly 10, including either or both of the side rails 11 and 12.

However, when the deformed region 20 is provided, the inherent torsional rigidity of the cross member 13 is altered from its initial original value (i.e., the value prior to forming the deformed region 20 therein) to a final desired value that is determined in accordance with the intended handling characteristic for the vehicular frame assembly 10. As with the original inherent torsional rigidity of the cross member 13, the final the inherent torsional rigidity of the cross member 13 can be calculated mathematically or determined empirically. Typically, the inherent torsional rigidity of the cross member 13 will be the greatest without the deformed region 20 (i.e., when the cross member 13 has the hollow, circular cross sectional shape illustrated in FIGS. 1, 2, and 3). Also, the inherent torsional rigidity of the cross member 13 will typically vary inversely with the size of the deformed region 20 (i.e., the inherent torsional rigidity of the cross member 13 will typically decrease as the size of the deformed region 20 increases).

By determining a desired handling characteristic for the vehicular frame assembly, a desired inherent torsional rigidity of the cross member 13 (and/or other structural member or members of the vehicular frame assembly) can be determined as well. With that knowledge, the deformed region 20 can be formed in the cross member 13 (and/or other structural member or members of the vehicular frame assembly) to achieve the desired inherent torsional rigidity. Thus, the overall handling characteristic of the vehicle to be customized from vehicle to vehicle in a relatively simple and inexpensive manner without altering the basic structure of the vehicular frame assembly 10.

The inherent torsional rigidity of each of the individual structural members, both before being deformed and after, can be determined in any desired manner. For example, the inherent torsional rigidity of each of the individual structural members can be calculated mathematically using standard reference equations. Alternatively, the inherent torsional rigidity of each of the individual structural members can be determined empirically using standard measurement techniques. Regardless, the ultimate objective of this invention is to customize the overall handling characteristic of the vehicular frame assembly 10 (and, therefore, the vehicle in which the vehicular frame assembly 10 is provided) in a relatively simple and inexpensive manner without altering the basic structure of the vehicular frame assembly 10 from vehicle to vehicle.

The deformation of the cross member 13 (and/or other components of the vehicular frame assembly 10) can occur before, during, or after the assembly of such components. For example, the vehicular frame assembly 10 can be manufactured by initially providing a vehicular frame assembly (such as shown in FIG. 1) that is formed from a plurality of structural members, each having an inherent torsional rigidity. Then, a desired inherent torsional rigidity can be determined for at least one of the plurality of structural members. Lastly, the at least one of the plurality of structural members can be deformed to achieve the desired inherent torsional rigidity. Alternatively, the vehicular frame assembly 10 can be manufactured by initially providing a plurality of structural members, each having an inherent torsional rigidity. A desired inherent torsional rigidity can be determined for at least one of the plurality of structural members, and the at least one of the plurality of structural members is deformed to achieve the desired inherent torsional rigidity. Lastly, the plurality of structural members can be assembled to form the vehicular frame assembly 10.

As an alternative, the desired inherent torsional rigidity for the cross member 13 can be achieved by forming portions of such cross member 13 from different materials. By properly selecting and combining such different materials, the desired inherent torsional rigidity for the cross member 13 can be achieved. The different materials can be joined together using any desired process. For example, if two different metallic materials are used to form the cross member 13, then they can be joined together using conventional welding or magnetic pulse welding techniques. If non-metallic and metallic materials are used to form the cross member 13, then they can be joined together using conventional magnetic pulse forming techniques.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a vehicular frame assembly comprising the steps of:
    (a) providing an initial vehicular frame assembly that is formed from a plurality of structural members, each having an inherent torsional rigidity;
    (b) determining a desired inherent torsional rigidity for at least one of the plurality of structural members; and
    (c) deforming the at least one of the plurality of structural members to achieve the desired inherent torsional rigidity.

2. The method defined in claim 1 wherein said step (b) is performed by calculating the desired inherent torsional rigidity mathematically.

3. The method defined in claim 1 wherein said step (b) is performed by determining the desired inherent torsional rigidity empirically.

4. The method defined in claim 1 wherein said step (c) is performed by deforming the at least one of the plurality of structural members to have a generally C-shaped cross sectional configuration.

5. The method defined in claim 1 wherein said step (c) is performed by deforming the at least one of the plurality of structural members to have a differing diameter portions.

6. The method defined in claim 1 wherein said step (c) is performed by magnetic pulse forming.

7. The method defined in claim 1 wherein said step (c) is performed by forming portions of the at least one of the plurality of structural members from different materials.

8. The method defined in claim 1 wherein said step (c) occurs after step (a).

9. The method defined in claim 1 wherein said step (c) is performed by deforming the at least one of the plurality of structural members to modify the initial vehicular frame assembly and thereby achieve the desired inherent torsional rigidity.

* * * * *